United States Patent [19]

Bohme et al.

[11] Patent Number: 5,136,369
[45] Date of Patent: Aug. 4, 1992

[54] CIRCUIT ARRANGEMENT FOR IDENTIFYING THE TRANSMISSION STANDARD OF A COLOR TELEVISION SIGNAL

[75] Inventors: Siegfried Bohme; Dieter Gutsmann; Hermann Treber, all of Hamburg, Fed. Rep. of Germany

[73] Assignee: U.S. Philips Corporation, New York, N.Y.

[21] Appl. No.: 685,374

[22] Filed: Apr. 12, 1991

[30] Foreign Application Priority Data

Apr. 20, 1990 [DE] Fed. Rep. of Germany ....... 4012580

[51] Int. Cl.⁵ .......................... H04N 5/46; H04N 11/22
[52] U.S. Cl. ......................................... 358/11; 358/17; 358/19; 358/23
[58] Field of Search .................. 358/23, 24, 17, 12, 358/13, 141, 140, 11

[56] References Cited

U.S. PATENT DOCUMENTS 4,897,713 1/1990 Nilleson ................................ 358/23
4,970,581 11/1990 O'Gwyn ............................... 358/17

FOREIGN PATENT DOCUMENTS 1901322 8/1969 Fed. Rep. of Germany .
2455379 6/1975 Fed. Rep. of Germany .
56-11748 3/1981 Japan .
0020980 1/1990 Japan .
2148652 5/1985 United Kingdom .

Primary Examiner—James J. Groody
Assistant Examiner—Glenton B. Burgess
Attorney, Agent, or Firm—Edward W. Goodman

[57] ABSTRACT

A circuit arrangement for identifying the transmission standard of a color television signal, having a chrominance subcarrier upon which chrominance information is modulated and color synchronising pulses, includes circuitry (14, 21, 24, 25) for determining the frequency of the chrominance subcarrier which, in those cases in which a given standard of the color television signal can unambiguously be concluded from the determined chrominance subcarrier frequency of the color television signal to be decoded, the decoder is immediately switched to the decoding of this signal of this standard, and in addition includes circuitry (23, 22) which determine the vertical deflection frequency of the television signal and ascertain whether the chrominance subcarrier has a line-sequentially alternating phase, and that in those cases in which the determined chrominance subcarrier frequency cannot unambiguously be assigned to a given standard, these information components are also used for identifying the standard of the color television signal to be decoded and for adjusting the decoder to this standard, in addition to the chrominance subcarrier frequency.

10 Claims, 1 Drawing Sheet

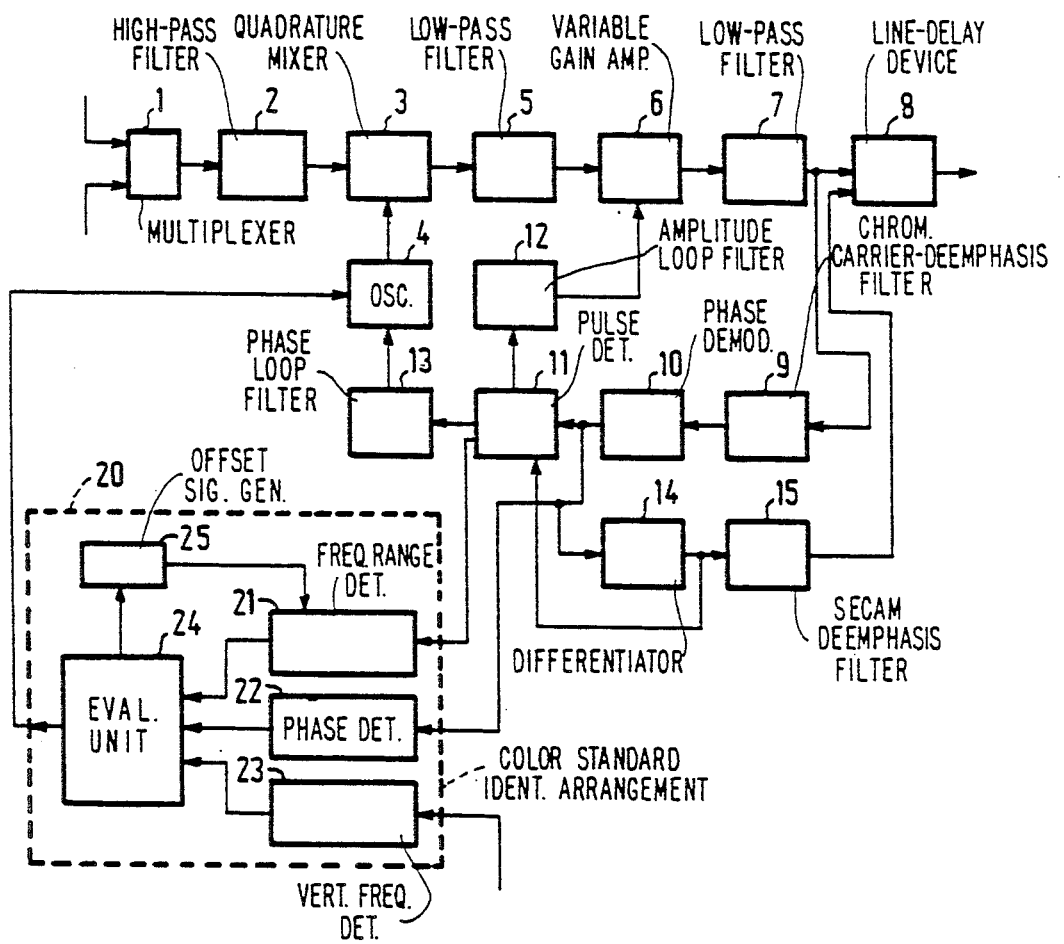

CIRCUIT ARRANGEMENT FOR IDENTIFYING THE TRANSMISSION STANDARD OF A COLOR TELEVISION SIGNAL

BACKGROUND OF THE INVENTION

1. Field of the Invention

The invention relates to a circuit arrangement for identifying in a color decoder, the transmission standard of a color television signal comprising a chrominance subcarrier upon which chrominance information is modulated, and synchronizing pulses.

For color television signals, there is an abundance of different transmission standards which differ from each other more specifically in the manner in which the chrominance information components are transmitted. These chrominance information components are modulated on a chrominance subcarrier which however may have different frequencies depending on the standard and which in addition may have a frequency which alternates from picture line to picture line of the color television signal. The chrominance information components themselves are also modulated in different manners. For color decoders which must be suitable for decoding color television signals of different transmission standards, this causes the problem that the color decoders must not only be suitable for decoding the different transmission standards but that they must also be capable of recognizing which transmission standard the color television signal to be decoded has.

2. Description of the Related Art

Known circuit arrangements for identifying the transmission standard of color television signals generally operate in an iterative manner, that is to say they first switch to any random standard, then check whether the color decoder is capable of decoding and switching the chrominance information components and, if not, switch to a subsequent standard. This procedure is continued until the color decoder is switched to a transmission standard for which a correct decoding of the chrominance information components of the color television signal is effected. Thus, in this procedure a given transmission standard is not immediately identified but the correct transmission standard is ultimately determined by testing different decodings. This requires a certain period of time which, particularly also in the case of short interruptions or interferences of the color television signal may be displayed in an annoying manner, since the search procedure starts again from the beginning after each interruption.

SUMMARY OF THE INVENTION

The invention has for its object to provide a circuit arrangement of the type defined in the opening paragraph, which allows an immediate identification of the transmission standard of a color television signal to be decoded.

According to the invention, this object is achieved in that means for determining the frequency of the chrominance subcarrier are provided which, at a frequency which alternates from line to line of the color television signal, determine the average value of the two chrominance subcarrier frequencies, that in those cases in which the determined and optionally averaged chrominance subcarrier frequencies can accurately be assigned to precisely one of the transmission standards to be identified even when the measuring inaccuracy occurring during the determination of the chrominance subcarrier frequency is taken into account, the decoder is immediately switched to the decoding of the signal of this standard, that furthermore means are provided which determine the vertical deflection frequency of the television signal and ascertain whether the chrominance subcarrier has a line-sequential alternating phase, and that means are provided which in those cases in which, the determined and possibly averaged chrominance subcarrier frequency cannot unambiguously be assigned to a given standard, utilize this information to identify the standard of the color television signal to be decoded and adjust the decoder to the identified standard.

As stated in the foregoing, the different transmission standards for color television signals differ more specifically in the fact that the chrominance subcarrier has different frequencies. In addition, some standards have a chrominance subcarrier frequency which alternates from picture line to picture line of the color television signal. In this case a mean value of the two chrominance subcarrier frequencies is determined.

Some transmission standards now have a chrominance subcarrier frequency or a mean value of the two chrominance subcarrier frequencies, respectively, in whose neighborhood no chrominance subcarrier frequencies of other standards are present. In these cases, it is possible to determine the transmission standard present immediately from the determined chrominance subcarrier frequency. However, there are actually very many further transmission standards having identical or closely adjacent chrominance subcarrier frequencies. In these cases, it is not sufficient to determine only the chrominance subcarrier frequency, particularly as the measuring inaccuracy during the determination of the chrominance subcarrier frequency in these cases does not allow a definite conclusion as regards the transmission standard present, as it is not sure which one of the very closely adjacent chrominance subcarrier frequencies contains the color television signal to be decoded. It is therefore provided in these cases to additionally determine whether the chrominance subcarrier has a phase relationship which alternates line sequentially and which vertical deflection frequency is provided in accordance with the color television signal to be decoded. There are then consequently three parameters available, namely the determined chrominance subcarrier frequency, the phase behavior of the chrominance subcarrier and the vertical deflection frequency. On the basis of these three parameters, it is possible to determine the present transmission standard in those cases in which no unambiguous conclusion can be drawn from the determined chrominance subcarrier frequencies as regards a given transmission standard.

In this circuit arrangement, the determination of the transmission standard of the color television signal is consequently effected by determining different parameters of the signal itself, so that an immediate identification of the transmission standard is possible, without the necessity of "testing out" the coding. A fast identification of the transmission standard present is consequently achieved. Because of the fact that two further parameters are utilized in those cases in which it is not possible to determine unambiguously from the determined and averaged chrominance subcarrier frequency, which averaging is effected if the chrominance subcarrier frequency alternates, what transmission standard is present, an adequate noise immunity during the identification is also obtained.

In accordance with an embodiment of the invention, the circuit arrangement in a color decoder in which for the demodulation of the chrominance information components a quadrature mixer and a mixer oscillator are provided, is characterized in that to determine the optionally averaged frequency of the chrominance subcarrier, a phase demodulator is provided to which the difference signals produced in the quadrature mixer are applied and which is followed by a differentiator producing a difference signal which, during the occurrence of the color synchronizing pulses, indicates the difference frequency between the mixer oscillator frequency and the optionally averaged chrominance subcarrier frequency of the color television signal, that means for generating an offset signal are provided which indicate the difference frequency between a preset, fixed standard frequency and the preset mixer oscillator frequency, that the difference signal and the offset signal are added together taking their sign into account, the value of this sum indicating the difference frequency between the optionally averaged chrominance subcarrier frequency of the color television signal to be decoded and the standard frequency.

Since the chrominance information components are modulated upon a chrominance subcarrier, it is necessary for the processing of the color information components in, for example, a color television receiver, to demodulate these color information components again, that is to say to reset them again to the baseband. As the color information components are modulated upon the chrominance subcarrier in essentially all the transmission standards in the form of two color difference signals having different phase and/or frequencies, this demodulation occurs in the color decoder in general, at least in some standards, by means of a quadrature mixer, to which the color television signals to be decoded and the output signal of a mixer oscillator are applied. The mixer oscillator must then oscillate at the frequency of the chrominance subcarrier or at a defined frequency between two chrominance subcarrier frequencies which alternate from line to line. This is however only ensured when the correct transmission standard was previously identified. If this is not the case, then the mixer oscillator operates at any different frequency, for example at the chrominance subcarrier frequency of an other transmission standard.

To determine the frequency of the chrominance subcarrier of the available color television signal to be decoded, it is provided for the circuit arrangement in accordance with the invention, that the difference signals produced in the quadrature mixer are applied to a phase demodulator which itself is followed by a differentiator. This differentiator produces a frequency-proportional signal which, during the color synchronizing pulses provided in the color television signals indicate the difference frequency between the mixer oscillator frequency and the optionally averaged chrominance subcarrier frequency of the color television signal. Should the mixer oscillator already have been adjusted to the correct frequency of the chrominance subcarrier of the color television signal to be decoded, then this difference frequency has zero value, that is to say the two color difference signals have already been converted to the baseband. If however the correct color television standard has not yet been identified or the mixer oscillator does not operate at the frequency of the chrominance subcarrier of the color television signal present, then the color difference signals are not converted to the baseband but a conversion to a carrier of another frequency takes place. In this case, the differentiator then supplies an output signal which indicates the difference frequency between the mixer oscillator frequency and the chrominance subcarrier frequency of the television signal. For a signal having a line-sequentially alternating chrominance subcarrier frequency, this signal has values which change from line to line and are averaged.

In addition, means for generating an offset signal are provided. This offset signal is based, on the one hand, on a preset, fixed standard frequency and, at the other hand, on the adjusted mixer oscillator frequency, which is indeed known. The offset signal represents the difference frequency between this standard frequency and the adjusted mixer oscillator frequency.

Both the difference signal and also the offset signal are added together, taking the occurring sign into account. Thus a sum signal is obtained which indicates the difference frequency between the averaged chrominance subcarrier frequency of the color television signal to be decoded and the standard frequency. Since the standard frequency has a fixed value, the chrominance subcarrier frequency can immediately be decided from this sum value. Consequently, this sum value can directly be used for the appropriate setting of the frequency of the mixer oscillator. This is however only effected when this frequency occurs only at a predetermined transmission standard. If this is not the case, then, as described in the foregoing, the further parameters, phase behavior of the chrominance subcarrier and vertical deflection frequency, are also used.

Determining the phase behavior of the chrominance subcarrier, i.e. the determination whether it alternates as regards its phase from picture line to picture line, is advantageously possible in that, as is provided in accordance with a further embodiment of the invention, the means for determining the alternating phase of the chrominance subcarrier include a phase detector which, in the case of an alternating phase of the chrominance subcarrier, determines the from line to line differing phase from line to line.

In accordance with a further embodiment of the invention, it is provided that to determine the vertical deflection frequency of the color television signal, a counter is provided which counts the number of lines of the color television signal between two vertical synchronizing pulses, and that a conclusion is drawn from the line number thus obtained as regards the vertical deflection frequency of the color television signal.

The vertical deflection frequency can indirectly be obtained in that it is determined how many picture lines occur in the color television signal to be decoded between two vertical synchronizing pulses. In all the existing color television standards, it is a fact that signals having a 50 Hz vertical frequency have 625 lines and signals having a 60 Hz vertical deflection frequency have 525 lines per pictures. Thus the vertical deflection frequency present can be determined from the line number of a picture.

In accordance with an embodiment of the invention, it is provided that the standard frequency is chosen such that it approximately represents an average value of the different chrominance subcarrier frequencies of the standards to be identified. Such a choice of the standard frequency is advantageous as then the offset signal assumes relatively low values.

In general, a phase demodulator is always provided in the color decoders, to which the demodulated color difference signals are applied, to readjust the mixer oscillator as regards its phase relative to the phase of the chrominance subcarrier. Such a phase demodulator included in the decoder for the phase control can however, as is provided in a further embodiment of the invention, also be simultaneously used in the circuit arrangement according to the invention to determine the difference signal.

In accordance with a further embodiment of the invention, it is provided that several standards having chrominance subcarrier frequencies which are very near to each other are combined into one standard group, that the determination of the frequency of the chrominance subcarrier of the color television signal is only effected with such an accuracy that it can be determined to which color standard group the television signal to be decoded belongs, and that for the identification of the correct standard within the standard group, the vertical deflection frequency obtained and also the phase behavior of the chrominance subcarrier are used.

Several of the known transmission standards for color television signals have chrominance subcarrier frequencies which are very near to each other. In these cases, the identification of the standard is critical, as the frequencies of the chrominance subcarrier can fluctuate. In such cases, the obtained and optionally averaged frequency of the chrominance subcarrier is advantageously not directly used for the determination of the transmission standard, but the phase behavior of the chrominance subcarrier and the vertical deflection frequency are also used. Since an unambiguous identification of the transmission standard present is not possible without further measures in such standards having chrominance subcarrier frequencies which are very near to each other, these transmission standards can advantageously be combined into one standards group. The determination of the frequency of the chrominance subcarrier of the color television signal must then only be effected with such an accuracy that it is determined whether a color television signal present belongs to this standard group or not, i.e. the circuit arrangement must consequently operate with only such an accuracy during the determination of the frequency of the chrominance subcarrier, that it can be determined whether the frequency of a chrominance subcarrier is located in the frequency range which is covered by the chrominance carriers of the different standards of this group.

For the generation of the above-described offset signal, this means that, as is provided in accordance with a further embodiment of the invention, only one common offset signal is generated for a standards group in a manner such that when the mixer oscillator is adjusted to one of the chrominance subcarrier frequencies of the standard of this group, the offset signal indicates the difference frequency between the preset, fixed standard frequency and an average value of the chrominance subcarrier frequencies of the standards of this group.

As in the above-described case, the determination of the frequency of the chrominance subcarrier must only be effected with an adequate accuracy for the identification of standards group, it is sufficient for the offset signal not to be generated separately for each transmission standard of this group but that rather a common offset signal is produced which indicates the difference between the preset, fixed standard frequency and an average valve of the chrominance subcarrier frequencies of the standards of each respective group. The sum signal described in the foregoing then still has an adequate accuracy to allow the determination whether the chrominance subcarrier frequency of a color television signal to be decoded is included in the frequency range of the chrominance subcarrier of a standards group or not.

Also the evaluation of the sum signal of the difference signal and the offset signal needs, as is provided in accordance with a further embodiment of the invention, only to be effected with such an accuracy that it can be determined to which standards group the color television signal belongs.

In all those cases in which the determination of the optionally averaged frequency of the chrominance subcarrier is effected with only such an accuracy that it belongs to one of the standards groups, the identification of the transmission standard present is effected with the aid of two further parameters, namely the determination whether the chrominance carrier alternates as regards its phase from picture line to picture line, and which vertical deflection frequency is present. On the basis of the three parameters then available, namely the association of the chrominance subcarrier frequency with a given standards group and the further two parameters, the transmission standard present is then obtained. As soon as this standard has been determined, an adjustment of the color decoder to the exact chrominance subcarrier frequency of the standard present is then possible.

In accordance with a further embodiment of the invention, it is provided that the color television signal is a digital signal and the circuit arrangement for identifying the transmission standard a digital circuit arrangement. The circuit arrangement in accordance with the invention can be used with special advantage for a digital television signal as it operates with circuit elements which can be easily realized digitally.

BRIEF DESCRIPTION OF THE DRAWING

An embodiment of the invention shown in the sole Figure, in the form of a block circuit diagram, in the accompanying drawing, will now be described in greater detail hereinafter.

DESCRIPTION OF THE PREFERRED EMBODIMENT

The block circuit diagram shown in the Figure includes a digital color decoder comprising the circuit arrangement of the invention which also operates digitally, for identifying the transmission standard of a digital color television signal.

In the Figure, the blocks enclosed with a dotted line represent the circuit elements which are necessary for the circuit arrangement of the subject invention. The remaining blocks are typical in a color decoder. As will be described in greater detail hereinafter, some of the remaining blocks of the color decoder which are anyhow included in the decoder, are additionally utilized in the identification of the transmission standard.

Either a pure chrominance signal modulated on a chrominance subcarrier or a complete color television signal containing the luminance signal, chrominance information components modulated on a chrominance subcarrier, blanking periods and also synchronizing pulses, consequently what is commonly denoted the composite color signal, may be applied to a multiplexer 1 of the decoder in accordance with the Figure, arranged at the input side.

In a high-pass filter 2 arranged subsequent to the multiplexer 1, the luminance signal portions of a composite color signal, more specifically the relatively low frequency portions of this signal are suppressed. This high-pass filter must, however, be designed such that the chrominance subcarrier and any occurring sidebands are not yet suppressed. The high-pass filter 2 is followed by a quadrature mixer 3 to which furthermore the output signal of a mixer oscillator 4 is applied. A demodulation of the chrominance information components modulated on a chrominance subcarrier must be effected in the quadrature mixer 3. To that end, as will be described hereinafter, the oscillator frequency of the mixer oscillator 4 is to be adjusted to the frequency of the chrominance subcarrier of the color television signal to be decoded. A quadrature mixer is required as the chrominance information component in some transmission standards are modulated on a chrominance subcarrier in the form of two color difference signals having different phases. These two color difference signals are then demodulated in the quadrature mixer 3.

Since in the quadrature mixer 3 not only the desired difference signals representing the demodulated color difference signals, but also the corresponding sum signals occur, the quadrature mixer 3 is followed by a low-pass filter 5 which suppresses the sum signal produced in the mixer 3. This low-pass filter 5 is followed by a variable-gain amplifier 6, which has for its object to maintain the chrominance signals in the decoder at a nominal value. The amplifier 6 is followed by a further low-pass filter 7 which has the same object as the low-pass filter 5. The color difference signals outputted by the low-pass filter 7 are applied to a line-delay device 8 which, depending on the transmission standard present, performs a line-wise delay of the chrominance information components. At the output of the line delay device 8 the two color difference signals are then for example simultaneously available at the transmission of a SECAM signal, or available free from phase errors at the transmission of a PAL signal.

In this color decoder, shown in the Figure, it is necessary, for signals of those transmission standards in which the chrominance information components are amplitude-modulated on a chrominance subcarrier, that a readjustment of the phase of the output signal of the mixer oscillator relative to the phase of the chrominance subcarrier of the color television signal is continuously effected. In addition thereto, an amplitude control must be effected for signals of all the transmission standards. This phase or amplitude control is effected by means of the following circuit blocks:

The output signal of the low-pass filter 7 is applied to a chrominance carrier-deemphasis filter 9 which only acts on SECAM signals. This filter is commonly denoted as a "Cloche filter". A phase demodulator 10 which does not only effect a phase demodulation but also an amplitude detection of the color difference signals applied thereto, is arranged subsequent to the filter 9. Consequently the phase demodulator 10 supplies two output signals which represent indications as regards their phase and their amplitude. These signals are applied to a color synchronizing pulse detector 11 which evaluates the signals applied to it by the phase demodulator 10 during those periods of time in which a color synchronizing pulse occurs in the color difference signals, as only these color synchronizing pulses have a defined phase and a defined level. The color synchronizing pulse detector 11 compares the amplitude information supplied by the phase modulator 10 during the color synchronizing pulses to a nominal amplitude value and, when they deviate from this nominal value, applies corresponding signals to an amplitude loop filter 12. The output signal of this loop filter 12 is used to control the gain factor of the amplifier 6. The structure of the amplitude loop filter 12 determines the readjustment behavior of the overall assembly as regards the amplitude.

In addition, an evaluation of the phase of the chrominance carrier is effected during those periods of time in which a color synchronizing pulse occurs in the color difference signals. These signals are applied to a phase-loop filter 13. The output signals of the filter 13 are applied to the chrominance carrier oscillator 4 which, as regards the phase of its output signal, is controlled by these signals. The design of the phase-loop filter 13 determines the readjustment behavior of the circuit arrangement as regards the phase of the output signal of the mixer oscillator 4.

The signals produced by the phase demodulator 10 are further applied to a differentiator 14 whose output signal is applied, on the one hand, to the color synchronizing pulse detector 11 and, on the other hand, to a SECAM-video deemphasis filter 15, which has for its purpose to effect the video deemphasis provided in accordance with the SECAM standard. The output signals of the filter 15 are applied to the line delay device 8.

The decoder elements shown in the Figure and described so far are anyhow present in this decoder and in themselves do not allow of an identification of a transmission standard of the color television signal fed into the decoder. For such an identification an arrangement 20 for color standard identification is rather provided.

The arrangement 20 includes a frequency range detector 21 to which the output signals supplied by the differentiator 14 are applied by the color synchronizing pulse detector 11 during those periods of time in which color synchronizing pulses occur in the color difference signals. The frequency range detector 21 consequently receives the output signal from differentiator 14 during each color synchronizing pulse.

The arrangement 20 for color standard identification also includes a phase detector 22 which receives the phase measuring signals supplied by the phase demodulator 10 of the decoder.

The arrangement 20 further includes a vertical-frequency detector 23 which from a synchronizing circuit, not shown in the Figure, receives a signal which indicates when vertical synchronizing pulses occur in the color television signal.

The output signals of the frequency range detector 21, of the phase detector 22 and of the vertical frequency detector 23 are applied to an evaluation unit 24. An output signal of the evaluation unit 24 is applied to an arrangement 25 for the generation of the offset signal, whose output signal is again applied to the frequency range detector 21.

Now the arrangement 20 for color standard identification comprising block elements 21 to 25 will be described in greater detail as regards its mode of operation.

It is assumed that a composite color television signal whose transmission standard is unknown, is applied to the multiplexer I of the decoder. This means with a high degree of probability, that as regards the frequency of its output signal which is applied to the quadrature mixer 3 the chrominance carrier oscillator 4 is not adjusted to the frequency of the chrominance carrier of the color television signal to be decoded. This has for its consequence that the color difference signals are not demodulated but only converted to a different carrier frequency. This again has for its consequence that the phase demodulator 10 detects a continuously changing phase which is converted in the differentiator 14 into a frequency signal which indicates that carrier frequency to which the two color difference signals are now converted by means of the mixer 3. This frequency is identical to the difference frequency between the mixer oscillator frequency and the frequency of the chrominance subcarrier of the color television signal. This signal is evaluated in the color synchronizing pulse detector 11 during those periods of time in which the color difference signals have color synchronizing pulses, as only during these periods of time a defined frequency and phase of the chrominance subcarrier is given. This difference signal thus evaluated is applied to the frequency range detector 21 of the arrangement 20 for the object of color standard identification.

The evaluation unit 24 of the arrangement 20 has previously applied a signal to the chrominance carrier oscillator 4, by means of which a predetermined frequency of the oscillator was set in the chrominance carrier oscillator 4. As has already been described in detail in the foregoing, it must however first be assumed that this frequency is not identical to the frequency of the chrominance subcarrier of the color television signal to be decoded. The evaluation unit 24 applies a signal to the arrangement 25, which indicates to which frequency the chrominance carrier oscillator 4 was set. An offset signal, which indicates the difference frequency between a preset, fixed standard frequency and the set mixer oscillator frequency as indicated by the evaluation unit 24, is produced in the arrangement 25. This standard frequency, which is preset only once and then remains unchanged, is advantageously chosen such that it is approximately halfway the frequency range of the different chrominance subcarrier frequencies of the transmission standards. The offset signal produced in the arrangement 25 is applied to the frequency range detector 21.

In the frequency range detector 21, the sum of the offset signal produced by the arrangement 25 and the difference signal produced by the color synchronizing pulse detector 11 is now taken, in which operation the signs must be taken into account. In addition, in those cases in which the difference signal has values which alternate from picture line to picture line, since the chrominance subcarrier frequency alternates line-sequentially, averaging of the difference signal of two lines is effected. During the sum formation, a signal occurs which indicates the difference frequency between the optionally averaged chrominance subcarrier frequency of the chrominance signal to be decoded and the fixed, known standard frequency. On the basis of this signal which is further conveyed to the evaluation unit 24, this evaluation unit 24 is capable of concluding the optionally averaged chrominance subcarrier frequency of the television signal and from this signal to draw a conclusion about the transmission standard and consequently about the frequency to be adjusted in the oscillator 4, since the frequency of the standard signal is known.

After the evaluation unit 24 has determined that frequency to which the subcarrier oscillator 4 is to be adjusted, this setting of the chrominance carrier oscillator can either be effected immediately or further parameters supplied by the phase detector 22 and the vertical frequency detector 23 can be evaluated. Whether this occurs or not, depends on the fact whether the determined chrominance carrier frequency, to which the oscillator 4 is to be adjusted, is only present in one transmission standard. If so, then the chrominance carrier oscillator can immediately be adjusted to this frequency by means of the evaluation unit 24, as it is unambiguously determined which transmission standard is used.

If the determined chrominance carrier frequency is however present in several transmission standards, or have a plurality of transmission standards chrominance subcarrier frequencies which are very close to this frequency, then the determination of the chrominance subcarrier frequency alone is not yet sufficient. In these cases, the evaluation unit 24 also takes into consideration the signals recovered by the phase detector 22 and the vertical frequency detector 23 for the identification of the transmission standard of the color television signal to be decoded.

The output signal of the phase demodulator 10 is applied to the phase detector 22. From this signal, the phase detector 22 determines whether one of the two color difference signals applied to the phase demodulator 10 has a phase which alternates from picture line to picture line. If so, the phase detector 22 applies a corresponding signal to the evaluation unit 24.

The vertical frequency detector 23 includes a counter, not shown, by means of which the number of picture lines between two vertical synchronizing pulses is counted. From the number of picture lines between these pulses, it is possible to draw immediately a conclusion about the vertical deflection frequency of the color television signal, as all the transmission standards which operate with a deflection frequency of 50 Hz, have a nominal number of 625 lines per full picture, while those transmission standards which operate with a vertical deflection frequency of 60 Hz have a nominal number of 525 lines per full picture. It is therefore immediately possible to draw a conclusion about the vertical deflection frequency of the signal from the number of picture lines per full picture. The vertical frequency detector 23 applies a corresponding signal to the evaluation unit 24.

In those cases in which no immediate unambiguous conclusion about the transmission standard present can be drawn from the determined and optionally averaged frequency of the chrominance subcarrier, the evaluation unit 24 does not only evaluate the determined chrominance carrier frequency but also the signals supplied by the phase detector 22 and the vertical frequency detector 23; i.e. any determined line-sequentially alternating phase of the chrominance subcarrier or the determined vertical deflection frequency, respectively. From these three pieces of information, a conclusion can immediately and unambiguously be drawn in the evaluation unit 24 about the present transmission standard of the color television signal, since the known transmission standards always differ in at least one of the three parameters, and a corresponding signal cannot only be applied to the chrominance carrier oscillator 4, but also, in a manner not shown in the Figure, to certain circuit elements of the color decoder or of other switching elements of a color receiver, not shown in the Figure, for the purpose of adjusting it to the transmission standard present.

As has already been described in the foregoing, there are several color television transmission standards in which very similar chrominance subcarrier frequencies are provided. As these chrominance subcarrier frequencies can moreover also fluctuate in actual practice, it is possible that in those cases or when the signals are disturbed by noise, there are difficulties in identifying the standard. In these cases it is advantageous to combine several of these transmission standards into one standards group. For the circuit arrangement shown in the Figure this actually means that in the arrangement 25 only one common offset signal is generated for producing the offset signal for such a standards group. This consequently means that, when, by means of the evaluation unit 24, one of the chrominance subcarrier frequencies of these standards group was adjusted in the chrominance carrier oscillator 4, the arrangement 25 generates only one offset signal independent of the fact which of the chrominance subcarrier frequencies of the standards of this group was adjusted. This offset signal is structured such that it indicates the difference frequency between the preset fixed standard frequency and a mean value of the chrominance subcarrier frequency of the standards of this group. Consequently for all the chrominance subcarrier frequencies of this standards group adjusted in the chrominance carrier oscillator 4 only one common offset signal is produced. Additionally it can be provided in the frequency range detector 21 that the calculation of the sum value of the offset signal supplied by the arrangement 25 and of the difference signal supplied by the phase detector is effected only less accurately. In any case, when such a standards group formation is provided, the determination of the optionally averaged frequency of the chrominance subcarrier of the chrominance auxiliary signal fed into the detector is only effected with such an accuracy that it can be determined to which standards group the color television signal belongs. Consequently, it is then no longer necessary to determine the exact frequency of the chrominance subcarrier of the fed-in color television signal, but it is sufficient to determine whether the frequency of the chrominance subcarrier is included in the frequency range of the chrominance subcarrier of a standards group. In these cases, in addition to the evaluation of the frequency range, it is furthermore recommendable to evaluate the phase behavior of the chrominance carrier and the vertical deflection frequency. This procedure has the advantage that the determination of the frequency of the chrominance subcarrier fed into the decoder can be effected with a reduced accuracy, which accuracy must however still be sufficient to recognize to which standards group the fed-in signal belongs.

For the following color television transmission standards, the above-mentioned formation of standards groups can be effected in, for example, the following manner:

| Group 1: | PAL BG | 4.4 | 50 HZ |
|---|---|---|---|
| | NTSC | 4.4 | 50 HZ |
| | NTSC | 4.4 | 60 HZ |
| Group 2: | PAL N | 3.582 | 50 Hz |
| | PAL M | 3.576 | 60 Hz |

-continued

| | | | |
|---|---|---|---|
| | NTSC M | 3.579 | 60 Hz |

In this example the chrominance subcarriers of the transmission standard of the first group have the same frequency, namely 4.4 MHz. When such a frequency of the chrominance subcarrier is found, it is however not yet clear which of the transmission standards of the first group is present. These signals can however be distinguished by the further parameters. Thus, the PAL signal has a chrominance subcarrier phase which alternates from picture line to picture line. The two NTSC signals have constant phases of the chrominance subcarrier, but they differ as regards the vertical deflection frequency.

The transmission standards of the second group have indeed different frequencies of the chrominance subcarriers, but they are so near to each other than an unambiguous identification is not always ensured, more specifically when the frequencies of the chrominance subcarriers fluctuate. For that reason in this case, the further parameters such as the phase behavior of the chrominance carrier and the vertical deflection frequency are also used.

If in addition to these six transmission standards also the, for example, SECAM standard must be identified, in which the chrominance subcarrier during the color synchronizing pulse has a line-sequentially alternating frequency of 4.25 MHz or 4.406 MHz, then this transmission standard must not be assigned to the above-mentioned groups, but it can rather be identified directly, as for a signal of this standard having two different chrominance subcarrier frequencies a value which is averaged over two picture lines of the color television signal of the two chrominance subcarrier quiescent frequencies is determined, which to a sufficient extent differs from the frequency ranges covered by the chrominance subcarriers of the two above-mentioned groups. If therefore in this example an average chrominance subcarrier frequency of 4.328 MHz is determined, then the evaluation unit 24 can immediately switch the mixer oscillator 4 and also further elements of the decoders or also color receivers to the SECAM standard. If however neither a chrominance subcarrier frequency of 4.4 MHz or a chrominance subcarrier frequency of approximately 3.58 MHz is found, then the two further parameters are also used for the identification of the transmission standard.

For the above mentioned groups of color television transmission standards and also for the SECAM transmission standard, the difference signal and also the offset signal can be formed such that a difference frequency range between the mixer oscillator frequency and the chrominance subcarrier frequency of the color signal to be decoded of approximately 1.6875 MHz corresponds to a digital value range of the difference signal of approximately 2.048 and that as the offset signal for the first color television transmission standards group a digital value of 575, for the second group a value of −460 and for the SECAM signal a digital value of 397 is provided. When these values are then added together it can be concluded, independent of the adjusted oscillator frequency, what frequency the chrominance subcarrier of the received television signal has. As it is sufficient to recognize whether the chrominance subcarrier of the received color television signal has the chrominance subcarrier frequency of the SECAM-standard, or whether it can be assigned to one of the two standard groups, the sum formation of the difference signal and the offset signal can be effected or evaluated with a lower accuracy. If the above-mentioned digital values are binary encoded, then it is sufficient for the evaluation of the sum to evaluate the most significant bit as well as the most significant bit but one. In the above example, a transmission standard of the first group is then present, when the most significant bit has the value 1 and the most significant bit but one has the value zero. If, on the contrary the most significant bit has the value zero and the most significant bit but one has the value 1, then it can be decided that a television signal of the SECAM standard is present. If, in contrast thereto the two bit values are zero, then a transmission standard of the second group is present.

We claim:

1. A circuit arrangement in a color decoder for identifying the transmission standard of a color television signal comprising color synchronizing pulses and a chrominance subcarrier upon which chrominance information is modulated, characterized in that the circuit arrangement comprises:

means for determining a frequency of the chrominance subcarrier and, when the frequency alternates from line to line of the color television signal, for determining a means average of the two chrominance subcarrier frequencies;

first means, coupled to said means for determining the frequency or averaged frequency to the chrominance subcarrier, for identifying the television standard of the color television signal when said determined or averaged chrominance subcarrier frequency accurately corresponds to that of one of the transmission standards to be identified even when the measuring inaccuracy occurring during the determination of the chrominance subcarrier frequency is taken into account;

means for determining the vertical deflection frequency of the television signal, for ascertaining whether the chrominance subcarrier has a line-sequentially alternating phase, and for determining said alternating phase;

second means, coupled to said means for determining the vertical deflection frequency, for identifying the transmission standard of the color television signal by using information on the vertical deflection frequency and whether the chrominance subcarrier has a line-sequentially alternating phase; and means for switching said color decoder to one of said transmission standards in response to one of said first and second identifying means.

2. A circuit arrangement as claimed in claim 1, wherein said color decoder is a digital color decoder and includes, for demodulating the color information components, a quadrature mixer and a mixer oscillator, characterized in that said first identifying means comprises:

a phase demodulator for receiving difference signals produced by said quadrature mixture;

a differentiator coupled to an output of said phase demodulator for generating a difference signal, during the occurrence of the color synchronizing pulses, indicating the difference frequency between the mixer oscillator frequency and the averaged chrominance subcarrier frequency of the color television signal;

means for producing an offset signal indicating the difference frequency between a preset, fixed standard frequency and the adjusted mixer oscillator frequency; and means for adding together said difference signal and said offset signal taking into account the signs of said difference and offset signals, the value of this sum signal indicating the difference frequency between the averaged chrominance subcarrier frequency of the color television signal to be decoded and the standard frequency.

3. A circuit arrangement as claimed in claim 1, characterized in that the means for determining the alternating phase of the chrominance subcarrier include a phase detector which, in the case of a line-sequentially alternating phase of the chrominance subcarrier, determines the alternating phase.

4. A circuit arrangement as claimed in claim 1, characterized in that said means for determining the vertical deflection frequency of the color television signal comprises a counter for counting the number of lines of the color television signal between two vertical synchronizing pulses, the vertical deflection frequency of the color television signal being determined from the number of lines counted.

5. A circuit arrangement as claimed in claim 2, characterized in that the standard frequency is chosen such that it represents approximately an average value of the different chrominance subcarrier frequencies of the television standards to be identified.

6. A circuit arrangement as claimed in claim 2, characterized in that the output signal of the phase demodulator is also used in the color decoder for a readjustment of the phase of the output signal of the mixer oscillator.

7. A circuit arrangement as claimed in claim 2, characterized in that several television standards having chrominance subcarrier frequencies which are very near to each other are combined into one standards group, wherein said means for determining the frequency of the chrominance subcarrier of the color television signal is only effected with such an accuracy that it can be determined to which standards group the television signal to be decoded belongs, and wherein for the identification of the correct television standard within the standards group, the means for determining the vertical deflection frequency and also the phase behavior of the chrominance subcarrier are used.

8. A circuit arrangement as claimed in claim 7, characterized in that for a standards group, only one common offset signal is generated in such a manner that when the mixer oscillator is adjusted to one of the chrominance subcarrier frequencies of the standard of this group, the offset signal indicates the difference frequency between the preset fixed standard frequency and an average value of the chrominance subcarrier frequencies of the standards of this group.

9. A circuit arrangement as claim in claim 8, characterized in that the evaluation of the sum signal of the difference signal and the offset signal is only effected with such an accuracy that it can be determined to which standards group the color television signal belongs.

10. A circuit arrangement as claimed in claim 1, characterized in that the color television signal is a digital signal and the circuit arrangement for identifying the transmission standard is a digital circuit arrangement.

* * * * *